(12) United States Patent
Bredl et al.

(10) Patent No.: US 11,815,122 B2
(45) Date of Patent: Nov. 14, 2023

(54) HOOK

(71) Applicant: INTREPID INDUSTRIES INC., La Porte, TX (US)

(72) Inventors: Erich E. Bredl, Houston, TX (US); Paxton E. Guidroz, Pearland, TX (US); Lakshminarasimhan S. Muthu, Pearland, TX (US)

(73) Assignee: Intrepid Industries Inc., La Porte, TX (US)

( * ) Notice: Subject to any disclaimer, the term of this patent is extended or adjusted under 35 U.S.C. 154(b) by 0 days.

(21) Appl. No.: 16/810,501

(22) Filed: Mar. 5, 2020

(65) Prior Publication Data
US 2021/0277931 A1 Sep. 9, 2021

(51) Int. Cl.
*F16B 45/00* (2006.01)
*A47G 25/32* (2006.01)
(Continued)

(52) U.S. Cl.
CPC .............. *F16B 45/00* (2013.01); *A47G 25/32* (2013.01); *F16L 3/06* (2013.01); *F16L 3/133* (2013.01); *H02G 7/06* (2013.01); *A47G 25/28* (2013.01)

(58) Field of Classification Search
CPC ... F16B 45/00; F16L 3/00; F16L 3/133; F16L 3/2235; F16L 3/06; H02G 7/06; H02G 7/08; H02G 7/10; B65H 75/366; B65H 2701/34; B65H 2701/3915; B65H 2701/33; B65H 2402/412; A47H 13/04; A47G 33/10;
(Continued)

(56) References Cited

U.S. PATENT DOCUMENTS

| 1,667,541 | A | 4/1928 | Edeburn |
| 2,018,836 | A | 10/1935 | Clemence |

(Continued)

FOREIGN PATENT DOCUMENTS

| AT | 517615 B1 * | 3/2017 | ........... A47G 25/183 |
| CN | 107725569 | 2/2018 | |

(Continued)

OTHER PUBLICATIONS

CableSafe brochure, unknown.

*Primary Examiner* — Taylor Morris
(74) *Attorney, Agent, or Firm* — Quisenberry Law PLLC

(57) ABSTRACT

S-shaped hooks are disclosed that include an upper portion, a central inclined portion, and a lower portion. The central inclined portion is disposed between and joins the upper portion and the lower portion. The upper portion may include a generally horizontal section having a generally horizontal lower support surface. The generally horizontal lower support surface may include a recessed arcuate surface that may be generally centered on the generally horizontal lower support surface. The upper portion may include a retaining section extending downwardly from a distal end of the generally horizontal section. The lower portion may define a hook section. The lower portion may include one or any number of hooks for holding various items. The generally horizontal lower support surface may rest on a flat support surface, such as a section of angle iron, square tubing or flat bar. The recessed arcuate surface may rest on a circular surface.

17 Claims, 3 Drawing Sheets

(51) Int. Cl.
  *F16L 3/06* (2006.01)
  *H02G 7/06* (2006.01)
  *F16L 3/133* (2006.01)
  *A47G 25/28* (2006.01)

(58) Field of Classification Search
  CPC ...... A47G 25/28; A47G 25/32; A47G 25/325; F16G 15/04; F16G 17/00; B62H 3/12
  See application file for complete search history.

(56) References Cited

U.S. PATENT DOCUMENTS

| | | | | |
|---|---|---|---|---|
| 2,284,197 A * | 5/1942 | Greene | ................ | E21B 19/04 24/600.9 |
| 2,303,108 A * | 11/1942 | Blackburn | ............... | H02G 7/06 403/396 |
| 3,207,463 A * | 9/1965 | Downey | ................ | F16B 45/02 248/339 |
| 3,612,459 A * | 10/1971 | Walls | ...................... | F16B 45/06 248/215 |
| 3,638,283 A * | 2/1972 | Moretti | ................... | B66C 1/00 24/598.5 |
| 3,891,176 A * | 6/1975 | Downing | ................ | F16B 2/243 248/340 |
| 4,646,396 A * | 3/1987 | Geese | .................... | F16B 45/02 223/88 |
| 4,707,906 A * | 11/1987 | Posey | ..................... | A61G 7/0503 128/DIG. 26 |
| 4,824,057 A * | 4/1989 | Suprono | ................. | F16L 3/133 24/129 B |
| 4,835,934 A * | 6/1989 | Swenson | .................... | E04C 5/18 52/DIG. 1 |
| 4,957,259 A * | 9/1990 | Wolf, Jr. | ............... | A47F 5/0006 211/119 |
| 5,064,067 A * | 11/1991 | McAllister | ................ | F21S 4/10 206/420 |
| 5,507,460 A * | 4/1996 | Schneider | ........... | A61M 5/1418 24/601.2 |
| 5,553,823 A * | 9/1996 | Protz, Jr. | ................. | A01G 5/04 248/215 |
| 5,630,257 A * | 5/1997 | Brody | .................. | B60P 7/0823 24/130 |
| 5,779,198 A * | 7/1998 | Rutherford | ............... | F16L 3/18 248/58 |
| 5,957,416 A * | 9/1999 | Sellati | ..................... | H02G 3/26 248/58 |
| 6,003,803 A * | 12/1999 | Knapp | .................. | B65H 75/366 242/388 |
| 6,015,127 A * | 1/2000 | Carr | ....................... | A47F 5/0006 248/113 |
| 6,135,381 A * | 10/2000 | Teson | ..................... | B65H 75/06 242/404.3 |
| 6,195,851 B1 * | 3/2001 | Vollebregt | .............. | F16B 45/00 24/338 |
| 6,279,797 B1 * | 8/2001 | Snyder | ..................... | A45F 5/02 224/268 |
| 6,802,480 B1 * | 10/2004 | Martello | ................. | F16L 3/237 24/373 |
| 7,837,156 B1 * | 11/2010 | Handler | ................ | F16L 3/1218 248/58 |
| D629,679 S | 12/2010 | Riddell et al. | | |
| D646,151 S | 10/2011 | Potts et al. | | |
| D708,446 S | 7/2014 | Goodman et al. | | |
| 9,121,437 B1 * | 9/2015 | Carnicle | ................ | F16B 45/02 |
| 9,433,261 B1 * | 9/2016 | Miles | .................... | B60P 7/0823 |
| D810,547 S | 2/2018 | Lynn et al. | | |
| 9,927,049 B1 * | 3/2018 | Scott | ...................... | G01N 21/53 |
| D858,261 S * | 9/2019 | Gong | ..................... | F16B 45/02 D8/367 |
| 10,881,782 B2 * | 1/2021 | Behrens | ................ | F16L 3/2235 |
| 2007/0241253 A1 * | 10/2007 | Chen | ........................ | F16B 45/00 248/304 |
| 2009/0302148 A1 * | 12/2009 | Auclair | ................ | B65H 75/366 242/588.2 |
| 2010/0007159 A1 * | 1/2010 | Henrion | .................. | F16G 15/02 294/82.2 |
| 2017/0335881 A1 * | 11/2017 | Briggs | ..................... | F16L 3/223 |
| 2018/0080496 A1 * | 3/2018 | Early | ...................... | F16B 45/00 |
| 2018/0257901 A1 * | 9/2018 | Potts | ........................ | B65H 54/72 |
| 2019/0101152 A1 * | 4/2019 | Turbenson | .............. | F16B 2/248 |

FOREIGN PATENT DOCUMENTS

| | | | | |
|---|---|---|---|---|
| DE | 9412008 U1 * | 9/1994 | .......... | B65H 75/366 |
| EP | 1044641 A2 * | 10/2000 | .......... | A47G 25/183 |
| EP | 2112113 A1 * | 10/2009 | .......... | B65H 75/446 |
| FR | 2439350 A1 | 5/1980 | | |
| KR | 200406799 Y1 * | 1/2006 | ............. | A47G 25/32 |
| KR | 20100001500 U * | 2/2010 | ................ | F16L 3/23 |
| KR | 101488372 B1 * | 5/2011 | ................ | F16L 3/14 |
| KR | 101229889 B1 * | 2/2013 | ............... | H02G 7/05 |
| KR | 101032687 B1 * | 2/2015 | ................ | F16L 3/14 |
| KR | 101492041 B1 * | 2/2015 | ............... | H02G 9/02 |
| KR | 20210011221 A * | 2/2021 | ............... | H02G 7/06 |

\* cited by examiner

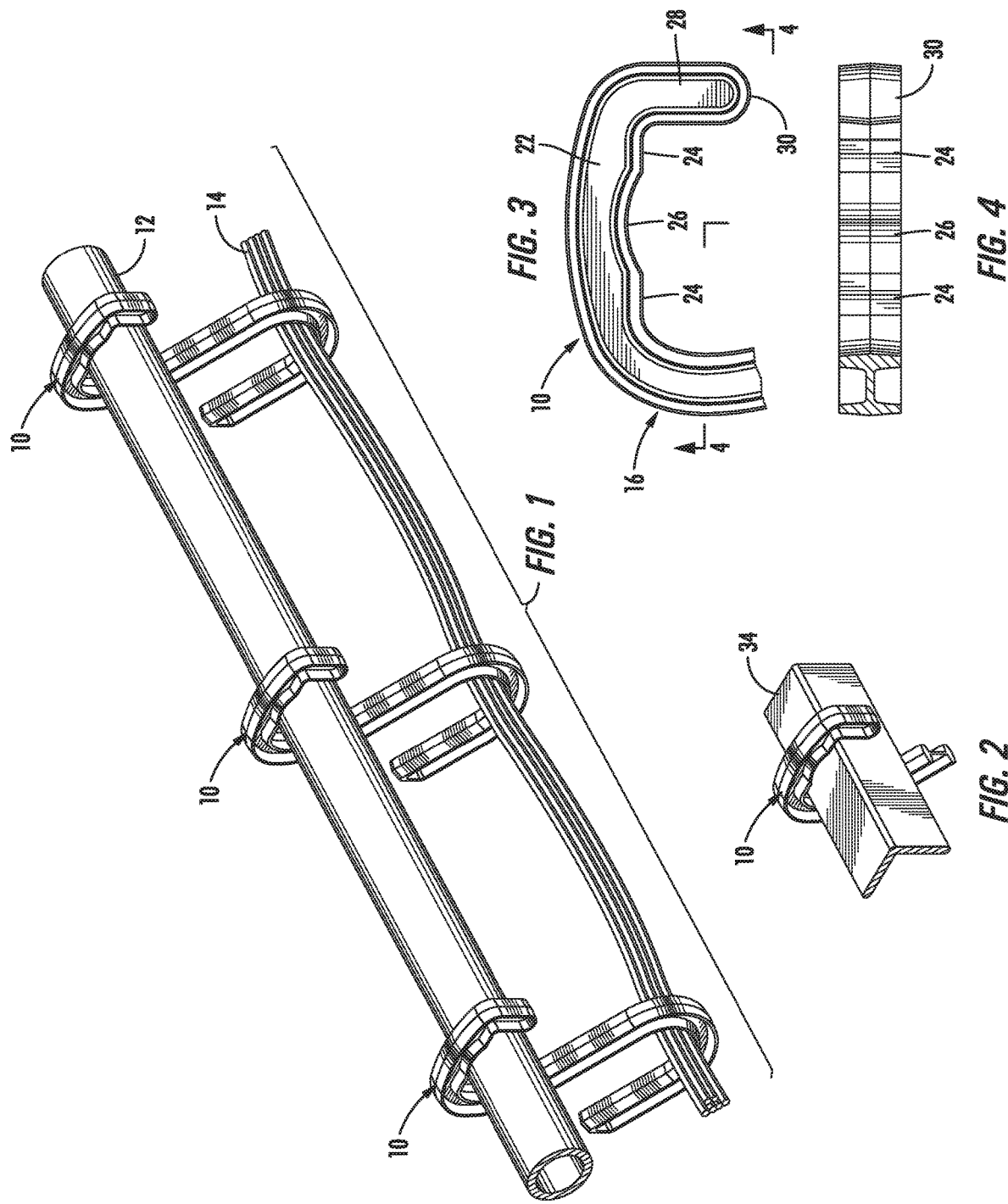

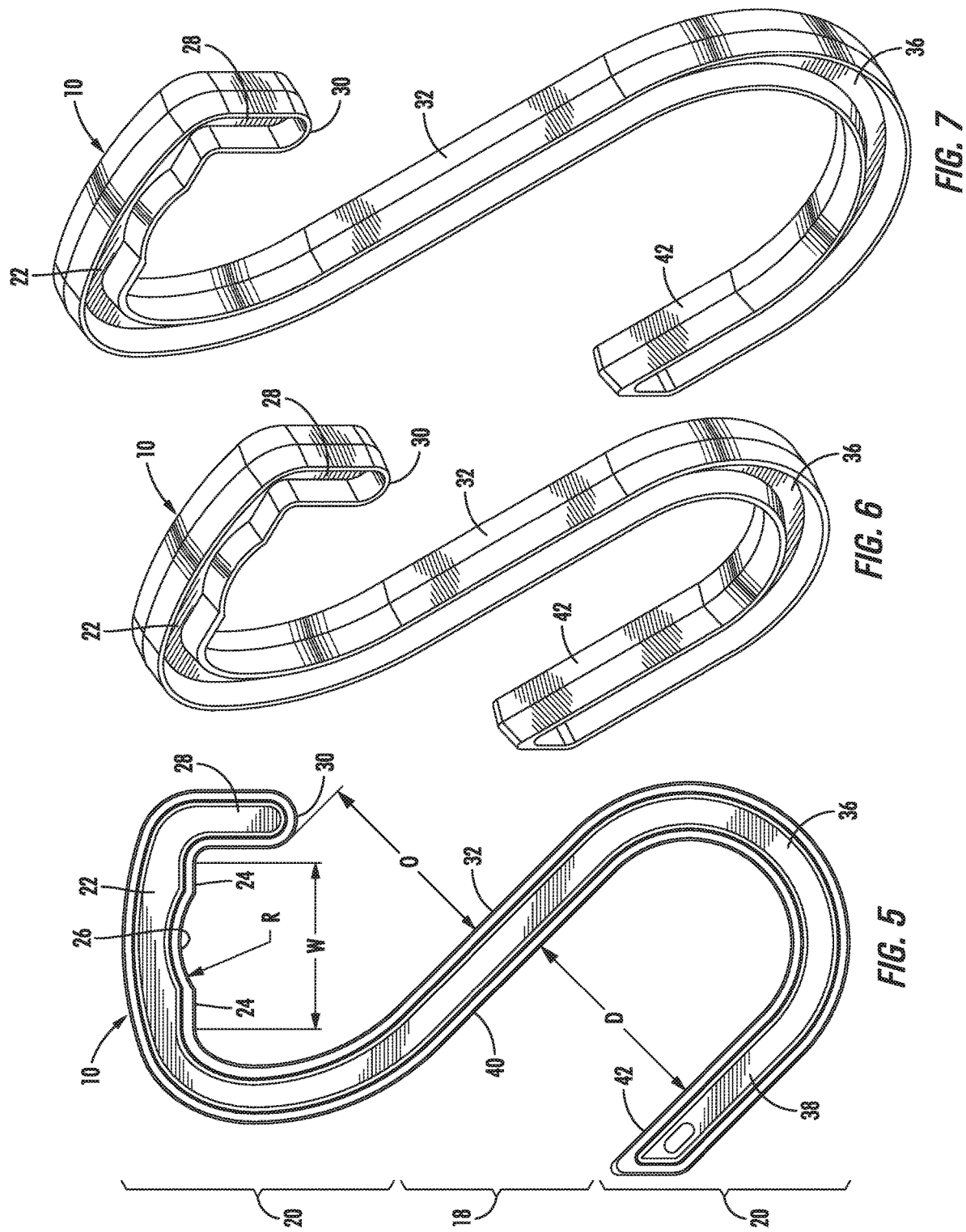

HOOK

BACKGROUND OF THE INVENTION

1. Field of the Invention

The present inventions generally pertain to safety or organizational products, and more particularly to hooks for using in holding various items.

2. Description of the Related Art

It is known to use S-shaped hooks, sometimes referred to as S-Hooks, in industrial settings for a variety of applications. For example, S-Hooks may be used to assist with cable management and housekeeping. S-Hooks are an easy and effective way to keep cords up and prevent tripping hazards. Safety hooks may be applied in industrial settings, and may function as a safety product to suspend hoses, electrical wires, cables, work lines, and equipment, thereby assisting to reduce the potential for trips, slips, falls, or other hazards caused from unsafe objects on the floor or walking surface, for example. S-Hooks may be used in place of ropes, lashing, or zip ties, for example. An example of a commercially-available S-Hook is a hook known as the CableSafe® safety hook available from Intrepid Industries Inc. located in La Porte, Tex.

Other examples of hooks can be found in the following patents: U.S. Pat. No. 1,667,541 to Edeburn; U.S. Pat. No. 2,018,836 to Clemence; U.S. Pat. No. 2,284,197 to Greene; U.S. Pat. No. D629,679 to Riddell et al.; U.S. Pat. No. D646,151 to Potts et al.; U.S. Pat. No. D708,446 to Goodman et al.; U.S. Pat. No. D810,547 to Lynn et al.; French Patent No. 2,439,350 to Daniel; and Chinese Patent No. 107,725,569.

As will become apparent from the following descriptions and discussion, the present inventions provide certain advantages and improvements in comparison to hooks described above and/or disclosed in the above-listed disclosures.

SUMMARY OF THE INVENTION

Various hooks are disclosed. In one aspect, a specific embodiment of the present inventions may be an S-shaped hook comprising: an upper portion, a central inclined portion, and a lower portion, the upper portion including a generally horizontal section having a generally horizontal lower support surface, the generally horizontal lower support surface having a recessed arcuate surface generally centered on the generally horizontal lower support surface, the central inclined portion being disposed between and joining the upper portion and the lower portion, the lower portion defining a hook section. Another feature of this aspect of the present inventions may be that the upper portion may include a retaining section extending downwardly from a distal end of the generally horizontal section. Another feature of this aspect of die present inventions may be that the downwardly extending retaining section may extend downwardly from the distal end in a generally perpendicular relationship to the generally horizontal section. Another feature of this aspect of the present inventions may be that the lower portion may include a curved section and an upwardly inclined section, the curved section extending from the central inclined section to the upwardly inclined section. Another feature of this aspect of the present inventions may be that the central inclined portion and the upwardly inclined section of the lower portion may be disposed in substantially parallel relationship. Another feature of this aspect of the present inventions may be that the lower portion may include a first upwardly inclined section and a second upwardly inclined section, and wherein a first hook opening may be defined between the central inclined portion and the first upwardly inclined section, and a second hook opening may be defined between the first upwardly inclined section and the second upwardly inclined section. Another feature of this aspect of the present inventions may be that the lower portion may include a first upwardly inclined section, a second upwardly inclined section, and a third upwardly inclined section, and wherein a first hook opening may be defined between the central inclined portion and the first upwardly inclined section, a second hook opening may be defined between the first upwardly inclined section and the second upwardly inclined section, and a third hook opening may be defined between the second upwardly inclined section and the third upwardly inclined section.

In another aspect, a specific embodiment of the present inventions may include an S-shaped hook comprising: an upper portion, a central inclined portion, and a lower portion, the upper portion including a generally horizontal section having a generally horizontal lower support surface, the generally horizontal lower support surface having a recessed arcuate surface generally centered on the generally horizontal lower support surface, the central inclined portion being disposed between and joining the upper portion and the lower portion, the lower portion including a curved section and an upwardly inclined section, the curved section extending from the central inclined section to the upwardly inclined section. Another feature of this aspect of the present inventions may be that the upper portion may include a retaining section extending downwardly from a distal end of the generally horizontal section. Another feature of this aspect of the present inventions may be that the downwardly extending retaining section may extend downwardly from the distal end in a generally perpendicular relationship to the generally horizontal section. Another feature of this aspect of the present inventions may be that the central inclined portion and the upwardly inclined section of the lower portion may be disposed in substantially parallel relationship. Another feature of this aspect of the present inventions may be that the lower portion may include a first upwardly inclined section and a second upwardly inclined section, and wherein a first hook opening may be defined between the central inclined portion and the first upwardly inclined section, and a second hook opening may be defined between the first upwardly inclined section and the second upwardly inclined section. Another feature of this aspect of the present inventions may be that the lower portion may include a first upwardly inclined section, a second upwardly inclined section, and a third upwardly inclined section, and wherein a first hook opening may be defined between the central inclined portion and the first upwardly inclined section, a second hook opening may be defined between the first upwardly inclined section and die second upwardly inclined section, and a third hook opening may be defined between the second upwardly inclined section and the third upwardly inclined section.

In yet another aspect, another specific embodiment of the presents inventions may include an S-shaped hook comprising an upper portion, a central inclined portion, and a lower portion, the upper portion including a generally horizontal section having a generally horizontal lower support surface, the generally horizontal lower support surface having a recessed arcuate surface generally centered on the generally horizontal lower support surface, the upper portion including a retaining section extending downwardly from a distal end of the generally horizontal section, the central inclined portion being disposed between and joining the upper portion and the lower portion, the lower portion defining a hook section. Another feature of this aspect of the present inventions may be that the downwardly extending retaining section may extend downwardly from the distal end in a generally perpendicular relationship to the generally horizontal section. Another feature of this aspect of the present inventions may be that the lower portion may include a curved section and an upwardly inclined section, the curved section extending from the central inclined section to the upwardly inclined section. Another feature of this aspect of the present inventions may be that the central inclined portion and the upwardly inclined section of the lower portion may be disposed in substantially parallel relationship. Another feature of this aspect of the present inventions may be that the lower portion may include a first upwardly inclined section and a second upwardly inclined section, and wherein a first hook opening may be defined between the central inclined portion and the first upwardly inclined section, and a second hook opening may be defined between the first upwardly inclined section and the second upwardly inclined section. Another feature of this aspect of the present inventions may be that the lower portion may include a first upwardly inclined section, a second upwardly inclined section, and a third upwardly inclined section, and wherein a first hook opening may be defined between the central inclined portion and the first upwardly inclined section, a second hook opening may be defined between the first upwardly inclined section and the second upwardly inclined section, and a third hook opening may be defined between the second upwardly inclined section and the third upwardly inclined section.

Other features, aspects and advantages of the present inventions will become apparent from the following discussion and detailed description.

BRIEF DESCRIPTION OF THE DRAWINGS

FIG. 1 is a perspective view showing three hooks hanging on a round pipe and in use to support a group of cables.

FIG. 2 is a perspective view showing an upper portion of a hook hanging on a section of angle iron.

FIG. 3 is a side view of an upper portion a hook constructed in accordance with a specific embodiment of the present inventions.

FIG. 4 is a cross-sectional view taken along line 4-4 of FIG. 3.

FIG. 5 is a side view of a specific embodiment of a hook constructed in accordance with the present inventions.

FIG. 6 is a perspective view of the hook shown in FIG. 5.

FIG. 7 is a perspective view of a specific embodiment of a hook constructed in accordance with the present inventions, which is similar to the hook shown in FIGS. 5 and 6, but with a larger opening in the lower portion of the hook.

Figure 8:
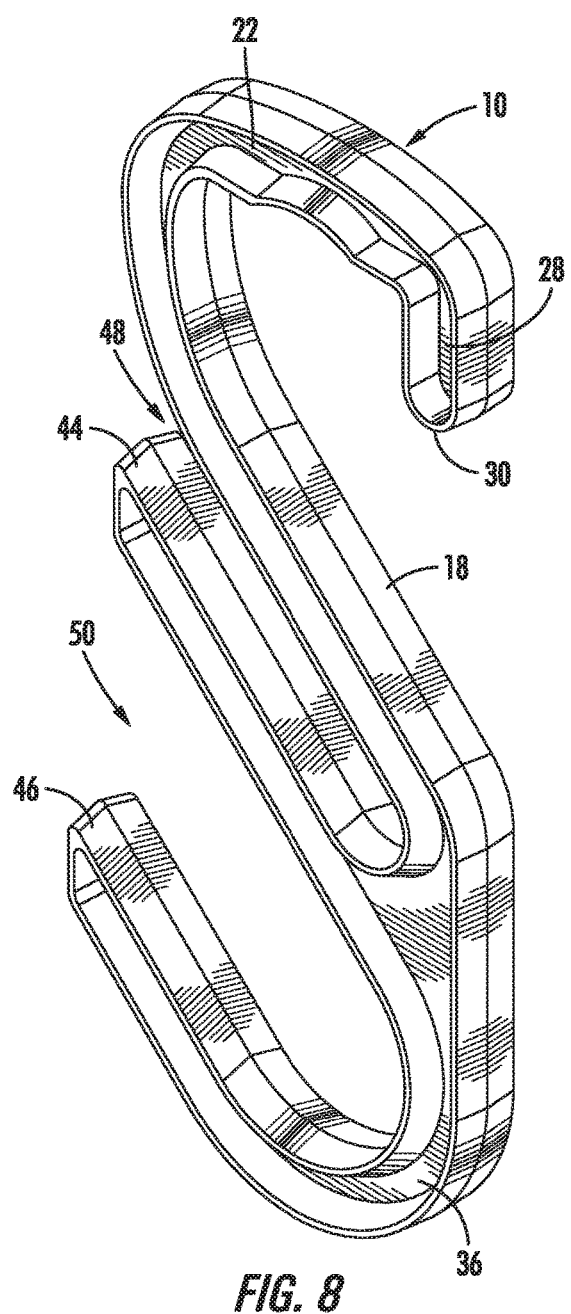
FIG. 8 is a perspective view of another specific embodiment of a hook constructed in accordance with the present inventions, which includes two lower hook sections.

While the present inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the various inventions as defined by the appended claims.

DETAILED DESCRIPTION OF THE INVENTION

Referring to the drawings in detail, wherein like numerals denote identical elements throughout the several views, and referring initially to FIG. 1, there is shown three hooks 10 hanging on a round pipe 12 to support and suspend a group of cables 14. Each hook 10 is a specific embodiment of a hook constructed in accordance with the present inventions. With reference to FIG. 5, it can be seen that, in a specific embodiment, the hook 10 may be generally shaped in the form of an "S," and may include an upper portion 16, a central inclined or transition portion 18, and a lower portion 20. The central inclined portion 18 is disposed between and joins the upper portion 16 and the lower portion 20. The lower portion 20 defines a hook section. The upper portion 16 may include a generally horizontal section 22 having a generally horizontal lower support surface 24 with a width W. In a specific embodiment, the width W may be in the range of two and one half to three inches. In a specific embodiment, the width W may be approximately 2.875 inches. In a specific embodiment, the generally horizontal lower support surface 24 may be provided with a recessed arcuate or concave surface 26. In a specific embodiment, the recessed arcuate surface 26 may be generally centered on the generally horizontal lower support surface 24. In a specific embodiment, the recessed concave surface 26 may have a radius R. In a specific embodiment, the radius R may be approximately three inches. In a specific embodiment, the upper portion 16 of the hook 10 may include a retaining section 28 extending downwardly from a distal end of the generally horizontal section 22 of the upper portion 16. In a specific embodiment, the retaining section 28 may extend downwardly in a generally perpendicular relationship to the generally horizontal section 22 of the upper portion 16.

In a specific embodiment, the size of an opening formed between a lower end 30 of the retaining section 28 and an upper surface 32 of the inclined section 18 of the hook 10 may be equal to a distance O. In a specific embodiment, the distance O should be large enough to allow the hook 10 to fit over a structure to which it is to be secured, such as a pipe 12, square tubing, flat bar, or angle iron 34 shown in FIG. 2. In a specific embodiment, the distance O may be in the range of three to three and one half inches. In a specific embodiment, the distance O may be approximately 3.35 inches. In a specific embodiment, the hook 10 may be designed to allow for flexing to the upper portion 16 of the hook 10 relative to the inclined portion 18 of the hook 10, such that the distance O may be increased by a minor amount, such as 0.25 inches, for example.

In a specific embodiment, the lower portion 20 of the hook 10 may include a curved section 36 and an upwardly inclined section 38. The curved section 36 extends from the central transition portion 18 to the upwardly inclined section 38. In a specific embodiment, the transition portion 18 and the upwardly inclined section 38 may be disposed in substantially parallel relationship to one another. In a specific embodiment, a distance D may define the size of a lower hook opening as extending from a lower surface 40 of the transition portion 18 to an upper surface 42 of the upwardly inclined section 38. In a specific embodiment, the distance D may be in the range from three and one half inches to six inches. For example, the hook 10 shown in FIG. 7 has a larger lower hook opening than for the hook 10 shown in FIG. 6.

Referring now to FIG. 8, another specific embodiment of a hook 10 is shown that includes two hooks as opposed to a single hook as shown in FIGS. 5-7. The hook 10 shown in FIG. 8 includes a first upwardly inclined section 44 and a second upwardly inclined section 46. A first hook opening 48 is defined between the first upwardly inclined section 44 and the central transition section 18. A second hook opening 50 is defined between the second upwardly inclined section 46 and the first upwardly inclined section 44. The sizes of the first and second hook openings 48 and 50 may be varied as desired depending on what the particular hook opening is intended to hold. For example, in the specific embodiment shown in FIG. 8, the size of the first hook opening 48 may be smaller than the size of the second hook opening 50. In this embodiment, the first hook opening 48 may be used to hold relatively small items, such as one or more electrical cords, whereas the second hook opening 50 may be used to hold relatively larger items, such as one or more water or air hoses.

Figure 9:
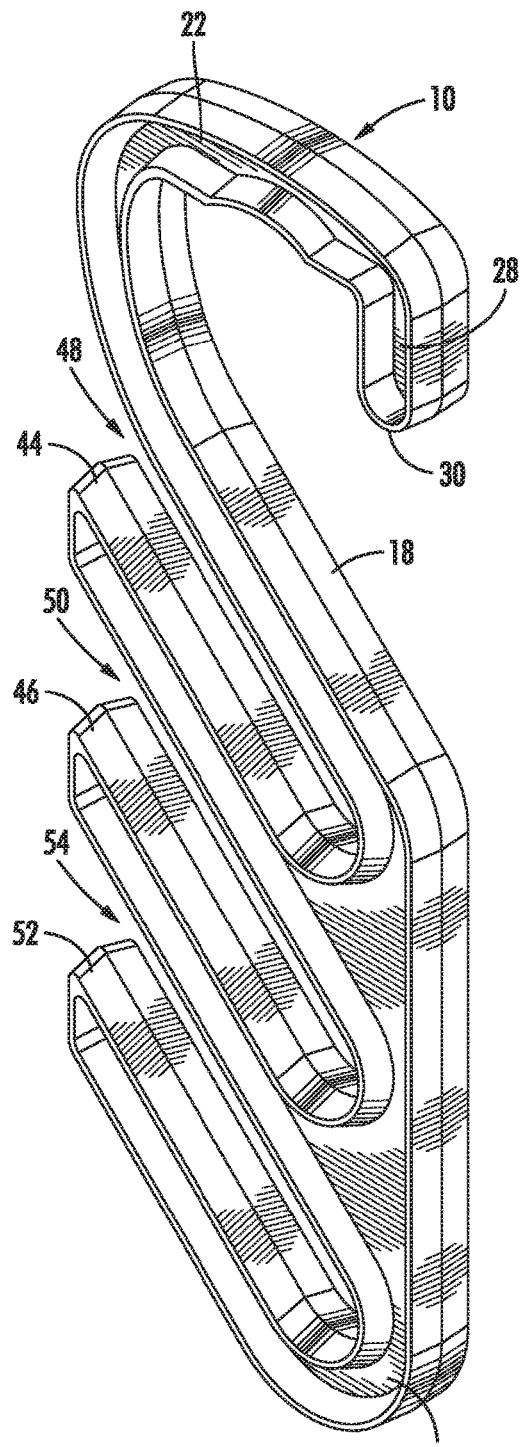
FIG. 9 is a perspective view of another specific embodiment of a hook constructed in accordance with the present inventions, which includes three lower hook sections.

Referring now to FIG. 9, another specific embodiment of a hook 10 is shown that includes three hooks as opposed to two hooks as shown in FIG. 8, or a single hook as shown in FIGS. 5-7. The hook 10 shown in FIG. 9 includes a first upwardly inclined section 44, a second upwardly inclined section 46, and a third upwardly inclined section 52. A first hook opening 48 is defined between the first upwardly inclined section 44 and the transition section 18. A second hook opening 50 is defined between the second upwardly inclined section 46 and the first upwardly inclined section 44. A third hook opening 54 is defined between the third upwardly inclined section 52 and the second upwardly inclined section 46. The sizes of the first, second and third hook openings 48, 50 and 54 may be varied as desired depending on what the particular hook opening is intended to hold. For example, in the specific embodiment shown in FIG. 9, the sizes of all three hook openings 48, 50 and 54 are all approximately the same size.

It is noted that the design of the upper portions 16 of the various embodiments of the hooks 10 shown in FIGS. 1-9 is the same in that in each embodiment the upper portion 16 includes a generally horizontal section 22 having a generally horizontal lower support surface 24 that includes an arcuate or concave recessed surface 26. This design facilitates positive engagement of the hook 10 with the structure on which the hook 10 may be hung. For example, as shown in FIG. 1, if the support structure is circular, such as the round pipe 12, then the recessed arcuate surface 26 on the hook 10 is adapted for mating engagement with the round pipe 12, such that the hook 10 will be securely positioned and centered on the round pipe 12. As another example, if the support structure has a flat upper surface, such as on a section of square tubing, flat bar, or a section of angle iron as shown in FIG. 2, then the generally horizontal lower support surface 24 on the hook 10 is adapted for mating engagement with such flat upper surface, such that the hook 10 will be securely positioned thereon.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Further, for purposes of this description, the terms "horizontal" and "inclined" have been used to describe various aspects of various portions of the hooks disclosed herein, and should not be taken as a limitation with respect to the manner in which the hooks are disposed when in use. Those terms have been used as a frame of reference and with the understanding that the hooks described and claimed are situated as shown for example in FIG. 5. Further, while various dimensions have been included above, by way of example only, such as for the radius R, the distance D, the width W and the opening O, the scope of the present inventions is not limited to those ranges, but instead also encompass dimensions greater than and smaller than those given by way of example hereinabove. Accordingly, the inventions are therefore to be limited only by the scope of the appended claims.

The invention claimed is:

1. An S-shaped hook comprising:
an upper portion,
a central inclined portion, and
a lower portion,
the upper portion including a generally horizontal section having a generally horizontal lower support surface, the generally horizontal lower support surface having a recessed arcuate surface generally centered on, and extending over a substantial portion of, the generally horizontal lower support surface,
the central inclined portion being disposed between and joining the upper portion and the lower portion, the central inclined portion extending downwardly toward a position below the recessed arcuate surface of the generally horizontal lower support surface, and a center portion of the central inclined portion is substantially aligned with the recessed arcuate surface, the lower portion defining a hook section positioned below the central inclined portion and including a curved section and a first upwardly inclined section, the curved section extending between the central inclined portion and the first upwardly inclined section, an upper inclined surface of the central inclined portion extending continuously to an outer curved surface of the curved section of the lower portion, and
wherein the S-shaped hook comprises a one-piece construction.

2. The S-shaped hook of claim 1, wherein the upper portion includes a retaining section extending from a distal end of the generally horizontal section.

3. The S-shaped hook of claim 2, wherein the downwardly extending retaining section extends from the distal end in a generally perpendicular relationship to the generally horizontal section.

4. The S-shaped hook of claim 1, wherein the central inclined portion and the first upwardly inclined section of the lower portion are disposed in a substantially parallel relationship.

5. The S-shaped hook of claim 1, wherein the hook section further comprises a second upwardly inclined section, and wherein a first hook opening is defined between the central inclined portion and the first upwardly inclined section, and a second hook opening is defined between the first upwardly inclined section and the second upwardly inclined section.

6. The S-shaped hook of claim 1, wherein the hook section further comprises a second upwardly inclined section and a third upwardly inclined section, and wherein a first hook opening is defined between the central inclined portion and the first upwardly inclined section, a second hook opening is defined between the first upwardly inclined section and the second upwardly inclined section, and a third hook opening is defined between the second upwardly inclined section and the third upwardly inclined section.

7. An S-shaped hook comprising:
an upper portion,
a central inclined portion, and
a lower portion,
the upper portion including a generally horizontal section having a generally horizontal lower support surface, the generally horizontal lower support surface having a recessed arcuate surface generally centered on, and extending over more than half of, the generally horizontal lower support surface,
the central inclined portion being disposed between and joining the upper portion and the lower portion, the central inclined portion extending downwardly toward a position below the recessed arcuate surface of the generally horizontal lower support surface, and a center portion of the central inclined portion is substantially aligned with the recessed arcuate surface, the lower portion including a curved section and a first upwardly inclined section, the curved section extending between the central inclined portion and the first upwardly inclined section, and an upper inclined surface of the central inclined portion extending continuously to an outer curved surface of the curved section of the lower portion, and
wherein the S-shaped hook comprises a one-piece construction.

8. The S-shaped hook of claim 7, wherein the upper portion includes a retaining section extending downwardly from a distal end of the generally horizontal section.

9. The S-shaped hook of claim 8, wherein the downwardly extending retaining section extends downwardly from the distal end in a generally perpendicular relationship to the generally horizontal section.

10. The S-shaped hook of claim 7, wherein the central inclined portion and the first upwardly inclined section of the lower portion are disposed in a substantially parallel relationship.

11. The S-shaped hook of claim 7, wherein the lower portion further comprises a second upwardly inclined section, and wherein a first hook opening is defined between the central inclined portion and the first upwardly inclined section, and a second hook opening is defined between the first upwardly inclined section and the second upwardly inclined section.

12. The S-shaped hook of claim 7, wherein the lower portion further comprises a second upwardly inclined section and a third upwardly inclined section, and wherein a first hook opening is defined between the central inclined portion and the first upwardly inclined section, a second hook opening is defined between the first upwardly inclined section and the second upwardly inclined section, and a third hook opening is defined between the second upwardly inclined section and the third upwardly inclined section.

13. An S-shaped hook comprising:
an upper portion,
a central inclined portion, and
a lower portion,
the upper portion including a generally horizontal section having a generally horizontal lower support surface, the generally horizontal lower support surface having a recessed arcuate surface generally centered on, and extending over a substantial portion of, the generally horizontal lower support surface, the upper portion including a retaining section extending downwardly from a distal end of the generally horizontal section,
the central inclined portion being disposed between and joining the upper portion and the lower portion, the central inclined portion extending downwardly toward a position below the recessed arcuate surface of the generally horizontal lower support surface, and a center portion of the central inclined portion is substantially aligned with the recessed arcuate surface,
the lower portion defining a hook section including a curved section and a first upwardly inclined section, the curved section extending between the central inclined portion and the first upwardly inclined section, and an upper inclined surface of the central inclined portion extending continuously to an outer curved surface of the curved section of the lower portion, and
wherein the S-shaped hook comprises a one-piece construction.

14. The S-shaped hook of claim 13, wherein the downwardly extending retaining section extends downwardly from the distal end in a generally perpendicular relationship to the generally horizontal section.

15. The S-shaped hook of claim 13, wherein the central inclined portion and the first upwardly inclined section of the lower portion are disposed in a substantially parallel relationship.

16. The S-shaped hook of claim 13, wherein the hook section further comprises a second upwardly inclined section, and wherein a first hook opening is defined between the central inclined portion and the first upwardly inclined section, and a second hook opening is defined between the first upwardly inclined section and the second upwardly inclined section.

17. The S-shaped hook of claim 13, wherein the hook section further comprises a second upwardly inclined section, and a third upwardly inclined section and wherein a first hook opening is defined between the central inclined portion and the first upwardly inclined section, a second hook opening is defined between the first upwardly inclined section and the second upwardly inclined section, and a third hook opening is defined between the second upwardly inclined section and the third upwardly inclined section.

* * * * *